June 25, 1957

R. C. MEADE 2,797,376

ELECTRONIC MOTOR

Filed Feb. 3, 1955

3 Sheets—Sheet 1

INVENTOR.
ROBERT C. MEADE
BY
ATTORNEYS

June 25, 1957  R. C. MEADE  2,797,376
ELECTRONIC MOTOR
Filed Feb. 3, 1955  3 Sheets-Sheet 2

INVENTOR.
ROBERT C. MEADE
BY
ATTORNEYS

June 25, 1957 R. C. MEADE 2,797,376
ELECTRONIC MOTOR
Filed Feb. 3, 1955 3 Sheets-Sheet 3

——— OUTPUT VOLTAGE OF DEMODULATOR 50
- - - OUTPUT VOLTAGE OF DEMODULATOR 60

——— CURRENT IN COIL 26
- - - CURRENT IN COIL 28

INVENTOR.
ROBERT C. MEADE
BY
ATTORNEYS

United States Patent Office 2,797,376
Patented June 25, 1957

2,797,376
ELECTRONIC MOTOR

Robert C. Meade, China Lake, Calif., assignor to the United States of America as represented by the Secretary of the Navy Application February 3, 1955, Serial No. 486,041

5 Claims. (Cl. 318—254)

(Granted under Title 35, U. S. Code (1952), sec. 266)

The invention described herein may be manufactured and used by or for the Government of the United States of America for governmental purposes without the payment of any royalties thereon or therefor.

This invention relates to electric motors, and in particular to an electric motor for driving the rotor of a gyroscope.

The rotor of the motor constituting this invention is permanently magnetized. The position, or orientation, of the rotor is sensed by saturable reactors. Variations in the intensity of magnetization of the saturable reactor is converted by an electrical circuit into a varying electrical signal which is used to control the flow of current through motor drive coils. Interaction between the magnetic field of the permanent magnet and the varying magnetic fields of the motor drive coils produces a torque which drives the rotor in only one direction.

It is, therefore, an object of this invention to provide an improved electric motor particularly suited for use in a gyroscope.

It is a further object of this invention to provide an improved electric motor in which the torque developed is substantially constant over the entire speed range of the motor.

It is still a further object of this invention to provide a self starting constant torque motor which will drive the rotor of a motor in only one direction.

Figure 1:
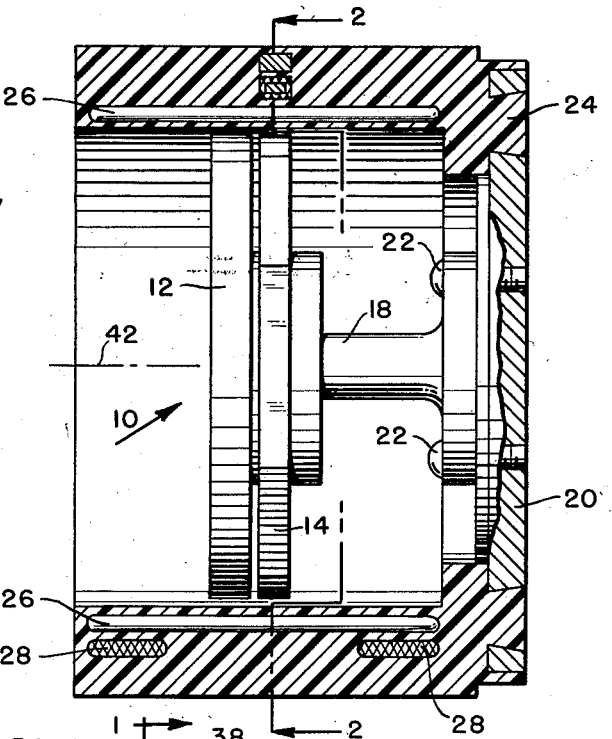
Figure 2:
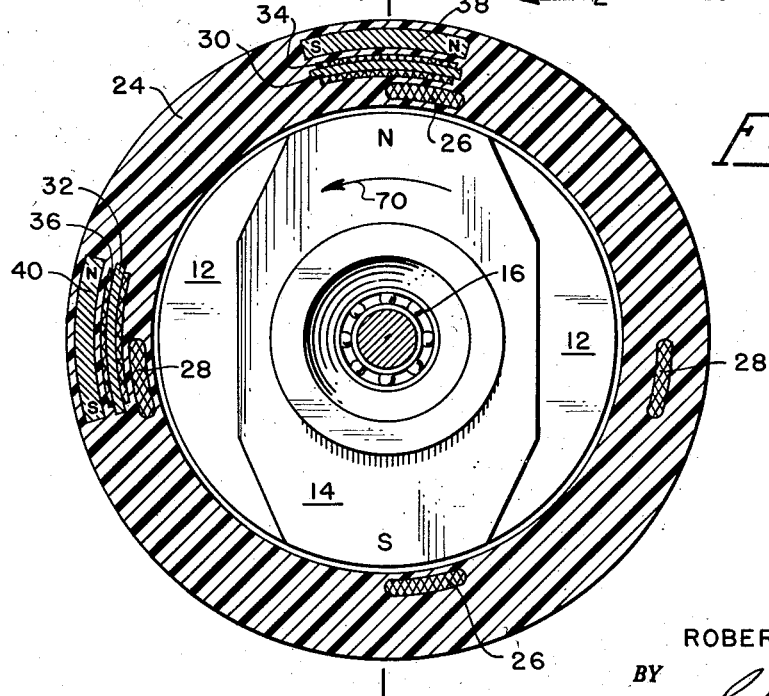
Figure 3:
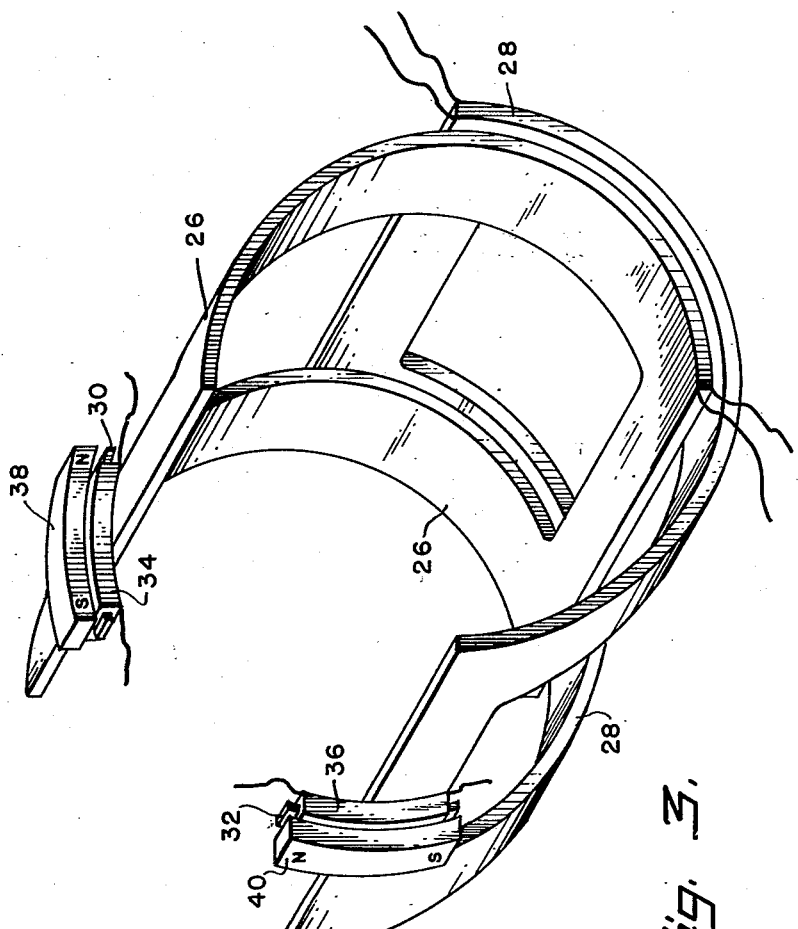
Figure 4:
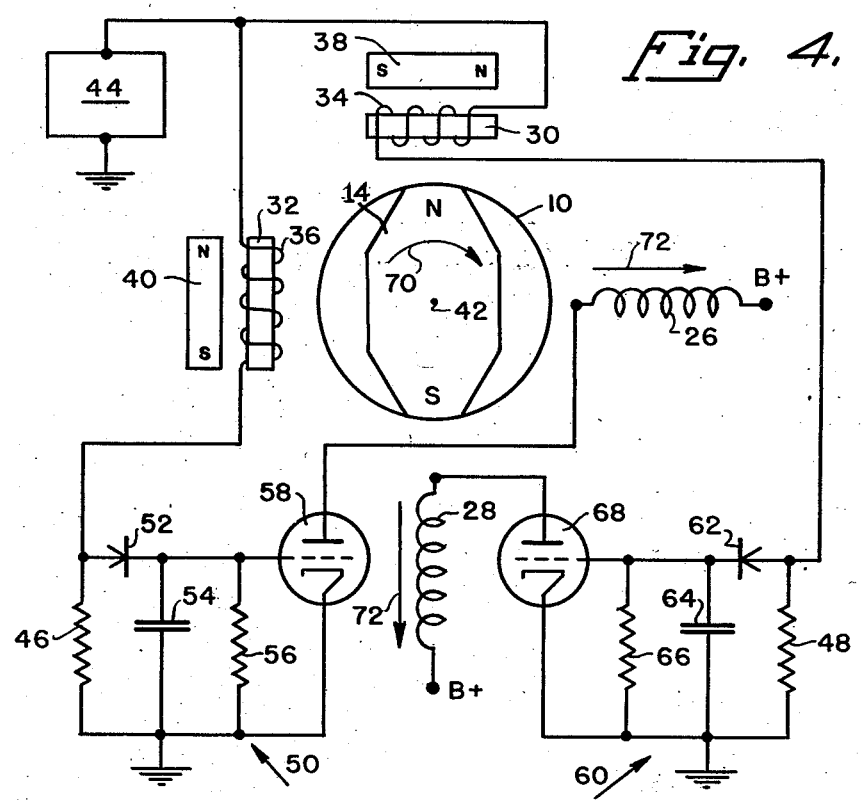
Figure 5:
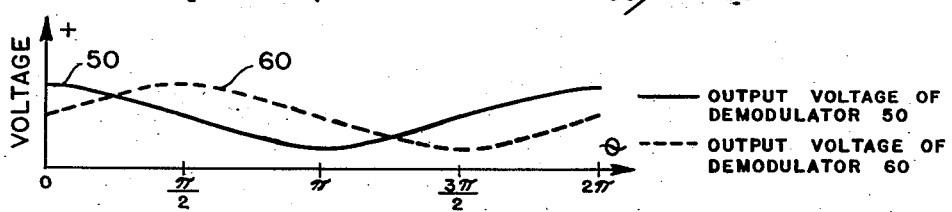
Figure 6:
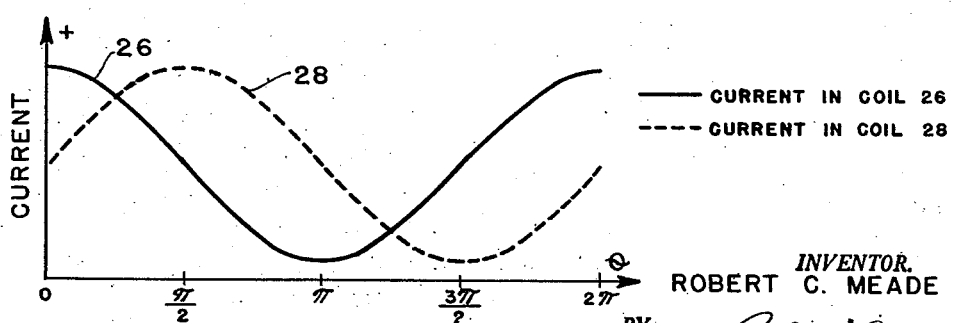

Other objects and many of the attendant advantages of this invention will be readily appreciated as the same become better understood by reference to the following detailed description when considered in connection with the accompanying drawings wherein:

Fig. 1 is a section taken on line 1—1 of Fig. 2,
Fig. 2 is a section taken on line 2—2 of Fig. 1,
Fig. 3 is a schematic perspective view of components of the motor,
Fig. 4 is a schematic view of a motor,
Fig. 5 is a plot of the demodulator output voltages against the position of the rotor,
Fig. 6 is a plot of the current through the motor drive coils against the position of the rotor.

Referring now to the drawings wherein like reference characters designate like or corresponding parts throughout the several views, there is seen in Fig. 1 rotor 10 of a gyroscope. Rotor 10 is comprised of a cylindrical disc 12 which provides mass and a permanent magnet 14, which are fixedly secured together. Magnet 14 is located on rotor 10 so that its poles are near the circumference of rotor 10 and they lie on a straight line substantially through the center of rotor 10. Magnet 14, in a preferred example, is made of "Alnico V," an alloy consisting of 8% aluminum, 14% nickel, 24% cobalt, 3% copper and the remainder iron. Rotor 10 is mounted on a conventional universal ball bearing 16 so as to have two degrees of precessional freedom. Bearing 16 is in turn mounted on post 18, which is secured to base plate 20 by screws 22. Plastic housing 24 is formed so as to be permanently secured to base plate 20.

Motor drive coils 26 and 28, saturable reactors comprising cores 30, 32 and reactor coils 34, 36, which are wound around cores 30, 32, respectively, and bias magnets 38, 40 are formed in, or embedded within, housing 24. Referring to Fig. 3 in which housing 24 has been omitted, the relative positions of motor drive coils 26, 28, cores 30, 32, coils 34, 36 and bias magnets 38, 40 with respect to each other are illustrated. Motor drive coils 26, 28 each extend approximately 180° around the circumference of rotor 10. They have substantially the same width, and each consists of the same number of turns of conductor. Saturable cores 30, 32 are made of a suitable magnetic material and are illustrated as being bar shaped. Coil 34 is wound around reactor core 30 and coil 36 is wound around reactor core 32. Coils 34, 36 have the same number of turns. Bias magnets 38, 40 and saturable reactor cores 30, 32 are similarly shaped and are illustrated in Figs. 2 and 3 as being curved so as to be substantially concentric with rotor 10. The reason for this is to permit the thickness of housing 24 to be minimized. A line through the center of motor drive coil 26 and reactor core 32 will intersect the longitudinal axis 42 of post 18, a line through the center of motor drive coil 28 and reactor core 30 will also intersect axis 42, and this latter line will be at right angles to the line through the center of coil 26 and reactor core 32. The intersection of these two lines is also approximately at the center of bearing 16, the point about which rotor 10 precesses and through which the axis of rotation of rotor 10 passes.

In order to explain the operation of the electric motor, attention is directed to Fig. 4. The components are schematically illustrated and their positions are as viewed from the right of the device as illustrated in Fig. 1. Oscillator 44 is used to produce an electrical A. C. voltage of substantially constant frequency and amplitude. The output of oscillator 44 is applied across two circuits in parallel, one circuit consisting of pickup coil 36 and resistor 46, which are connected in series, and the other circuit consisting of pickup coil 34 and resistor 48, which are also connected in series. The A. C. voltage across resistor 46 is applied to a conventional demodulator circuit 50 which consists of a current rectifier 52, a condenser 54 and resistor 56. The output current of demodulator 50 is a D. C. voltage of varying magnitude which exists across resistor 56. This voltage is applied to the control grid of amplifier tube 58. One terminal of motor drive coil 26 is connected to the plate of tube 58 and the other terminal is connected to a suitable source of plate potential. Similarly the A. C. voltage across resistor 48 is applied to demodulator circuit 60 which consists of a current rectifier 62, condenser 64, and resistor 66. Corresponding components of demodulators 50, 60 are of substantially the same values. The output voltage of demodulator 60 is a D. C. voltage of varying magnitude which exists across resistor 66. The output voltage of demodulator 60 is applied to the control grid of a second amplifier tube 68. One terminal of motor drive coil 28 is connected to the plate of tube 68 and the other terminal of coil 28 is connected to the same source of plate potential to which is connected motor drive coil 26.

When rotor 10 is also the rotor of the gyroscope, rotor 10 is initially caged by conventional means, which are not illustrated, prior to energization of the motor so that the axis of rotation of rotor 10 is fixed, and in the particular example illustrated, this position is parallel to the longitudinal axis 42 of post 18. Oscillator 44 is energized, and when the positive plate potential is applied to tubes 58 and 68 through motor drive coils 26, 28 the motor is energized. The output of oscillator 44 is applied across the circuit which includes coil 36 and resistor 46 as well as coil 34 and resistor 48. The reactance of coils 34, 36 depend upon the magnetic condition of reactor cores 30, 32, as is well known in the art. The magnetic conditions of reactor cores 30, 32 are determined by the magnetic fields of their respective bias magnets 38, 40 and the strength and direction of the magnetic field of magnet 14 which is determined by the orientation of rotor 10. Bias magnets 38, 40 are so located with respect to reactor cores 30, 32 that the intensity of magnetization of reactor cores 30, 32 due solely to the bias magnets is approximately one-half of the amount necessary to saturate them. The reactance of coil 36, for example, varies inversely as the function of the field strengths of reactor core 32. Since coil 36 and resistor 46 are connected in series and since the amplitude of the output voltage of oscillator 44 is constant, the voltage across resistor 46 will vary as an inverse function of the net field strength of saturable reactor core 32. Similarly, the voltage across resistor 48 will likewise vary as an inverse function of the net field strength of saturable reactor core 30.

Fig. 5 is a plot of the magnitude of the output signals of demodulators 50, 60 against the position of rotor 10 with the initial or zero position of rotor 10 corresponding to the position illustrated in Fig. 4. When rotor 10 is in this position, the magnetic field of permanent magnet 14 will have no effect on the field strength of saturable reactor core 30 since its magnetic field will be normal to that due to bias magnet 38. The reactance of coil 34 will be at its median value, and the A. C. voltage across resistor 48 will also be at its median value. At the same time the magnetic field of magnet 14 will add to the field of bias magnet 40 within saturable reactor core 32 so that the field strength in reactor core 32 will be a maximum. For this condition, the impedance of coil 36 is therefore at a minimum and the voltage across resistor 46 at a maximum, as is the output voltage of demodulator 50. As rotor 10 turns in the direction indicated by arrow 70 in Fig. 4 the output voltages of demodulators 50, 60 will vary substantially sinusoidally as shown in Fig. 5.

The output voltage of demodulator 50 is applied to the grid of tube 58. The current through coil 26 will be in phase with the output voltage of demodulator 50, and similarly the current through coil 28 will be in phase with the output voltage of demodulator 60. A plot of the currents through coils 26, 28 against the position of rotor 10 is seen in Fig. 6.

Motor drive coils 26, 28 are wound and connected in the circuit so that the magnetic fields produced by them are in the direction indicated by arrows 72. Thus, when rotor 10 is in the position illustrated in Fig. 4 maximum current will be flowing through coil 26 and the north pole of permanent magnet 14 will be attracted and the south pole repelled by the magnetic field produced by coil 26. At the same time, the magnetic field in coil 28 will be at its median value and, when dead-center is passed, will also be repelling the south pole and attracting the north pole of rotor 14. As a result, a torque will be developed tending to turn rotor 10 in the direction of arrow 70.

The magnitudes of the outputs of demodulators 50, 60 are dependent upon the orientation of rotor 10 and not upon its angular velocity. Therefore, the motor is self starting. For the same reason the currents in motor drive coils 26, 28 are determined by the signals from the demodulators and not by the angular velocity of rotor 10 and, therefore, the motor will turn rotor 10 at substantially constant torque irrespective of the angular speed of rotor 10 from zero to its maximum angular velocity. The maximum angular velocity is reached when the back E. M. F. induced in motor drive coils 26, 28 substantially equals that of the applied plate voltage. As a result, accurate speed regulation, which is very desirable in gyroscopes, is easily accomplished by regulating the magnitude of plate voltage of tubes 58, 68.

Obviously, many modifications and variations of the present invention are possible in the light of the above teachings. It is therefore to be understood that within the scope of the appended claims the invention may be practiced otherwise than as specifically described.

What is claimed is:

1. An electric motor comprising a rotor, means for mounting the rotor for rotation about an axis of rotation, a permanent magnet mounted on the rotor, the poles of the magnet being located near the periphery of the rotor and so that a straight line through the poles substantially intersects the axis of rotation of the rotor, a first motor drive coil mounted around the circumference of the rotor and extending substantially 180° around said circumference, a first saturable reactor, a first pick-up coil wound around said reactor, a first bias magnet mounted near said first saturable reactor, said saturable reactor and first motor drive coil being mounted so that a line through the center of the first saturable reactor and the center of the first motor drive coil substantially intersects the axis of rotation of the rotor, a first resistor connected in series with the first pickup coil, a second motor drive coil, said second motor drive coil being mounted around the circumference of the rotor and extending over an arc of substantially 180°, a second saturable reactor, a second pickup coil wound around said second saturable reactor, a second bias magnet mounted near said second reactor, said second saturable reactor and said second motor drive coil being so mounted that a straight line through the center of the saturable reactor and through the center of the second motor drive coil substantially intersects the axis of rotation of the rotor and is substantially at right angles to the line through the center of the first saturable reactor and the first motor drive coil, a second resistor connected in series with the second pickup coil, an oscillator, circuit means for applying the output of the oscillator across the first pickup coil and the first resistor, and across the second pickup coil and the second resistor, a first demodulator for demodulating the A. C. signal across the first resistor, a second demodulator for demodulating the A. C. signal across the second resistor, a first amplifier tube having a control grid, means for applying the output of the first demodulator to the control grid of the first tube, a second amplifier tube having a control grid, means for applying the output of the second demodulator to the control grid of the second tube, said first motor drive coil being connected in the plate circuit of the first tube and the second motor drive coil being connected in the plate circuit of the second tube, said motor drive coils having substantially the same number of turns and being substantially the same size.

2. In an electric motor comprising a magnetically polarized armature and field coils requiring unidirectional currents of instantaneous magnitudes varying in accordance with armature orientation relative to said field coils, in combination, saturable reactor means positioned to have its impedance characteristic influenced and varied by relative orientation of said armature and in accordance therewith, and means controlled by said saturable reactor means to supply said currents.

3. In an electric motor comprising a magnetically polarized armature and field coils requiring unidirectional currents of instantaneous magnitudes varying in accordance with armature orientation relative to said field coils, in combination, saturable reactor means positioned to have its impedance characteristic influenced and varied by relative orientation of said armature and in accordance therewith, and amplifier means controllable and controlled by said saturable reactor means to supply said varying unidirectional currents, said amplifier means being further controllable to adjust the maximum amplitude variations of said unidirectional currents.

4. An electrical motor comprising an armature magnetized to provide at least one pair of magnetic poles, at least one motor drive coil adapted, when suitably energized, to coact with said poles to develop motor action, an electrical circuit energized by an alternating voltage source and including means responsive to angular orientation of the magnetized armature relative to said coil to yield an output alternating voltage variable in amplitude in accordance with said angular orientation, means for supplying a continuous unidirectional current to said coil, and means for controlling the magnitude of said unidirectional current in accordance with the variable amplitude of said output alternating voltage.

5. An electrical motor comprising an armature magnetized to provide at least one pair of magnetic poles, at least one motor drive coil adapted, when suitably energized, to coact with said poles to develop motor action, and an electrical circuit including means influenced by said magnetized armature and responsive to angular orientation thereof to provide said coil with a continuous unidirectional current varying in accordance with said angular orientation.

References Cited in the file of this patent

UNITED STATES PATENTS

| | | |
|---|---|---|
| 2,512,325 | Hansen | June 20, 1950 |
| 2,538,216 | Stehlik | Jan. 16, 1951 |
| 2,648,786 | Kritter | Aug. 11, 1953 |
| 2,719,944 | Brailsford | Oct. 4, 1955 |